(12) United States Patent
Shih

(10) Patent No.: US 8,742,799 B2
(45) Date of Patent: Jun. 3, 2014

(54) SYSTEMS AND METHODS FOR DE-EMPHASIS LEVEL CALIBRATION IN VOLTAGE MODE DRIVERS

(75) Inventor: Yu-Nan Shih, Taichung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/598,905

(22) Filed: Aug. 30, 2012

(65) Prior Publication Data

US 2014/0062538 A1 Mar. 6, 2014

(51) Int. Cl.
*H03L 7/06* (2006.01)
(52) U.S. Cl.
USPC ........... 327/108; 327/109; 327/110; 327/111; 327/112
(58) Field of Classification Search
CPC ........... H03K 19/00361; H04L 25/028; H04L 25/0272
USPC .................................. 327/108–112
See application file for complete search history.

(56) References Cited

U.S. PATENT DOCUMENTS

| | | | |
|---|---|---|---|
| 6,704,818 B1 | 3/2004 | Martin et al. | |
| 7,119,611 B2 * | 10/2006 | Wyers et al. | 330/2 |
| 7,227,382 B1 * | 6/2007 | Talbot et al. | 326/87 |
| 7,368,902 B2 * | 5/2008 | Clements et al. | 324/601 |
| 7,570,071 B2 * | 8/2009 | Clements et al. | 324/762.02 |
| 7,698,802 B2 * | 4/2010 | Clements et al. | 29/593 |
| 7,821,290 B2 * | 10/2010 | Thomsen | 326/30 |
| 2004/0201416 A1 * | 10/2004 | Wyers et al. | 330/2 |
| 2006/0214826 A1 * | 9/2006 | Huang | 341/51 |
| 2006/0290439 A1 | 12/2006 | Martin et al. | |
| 2007/0096720 A1 * | 5/2007 | Clements et al. | 324/158.1 |
| 2008/0120838 A1 * | 5/2008 | Clements et al. | 29/857 |
| 2008/0122452 A1 * | 5/2008 | Clements et al. | 324/601 |
| 2009/0168854 A1 | 7/2009 | Liang et al. | |
| 2010/0079167 A1 * | 4/2010 | Thomsen | 326/83 |
| 2013/0162300 A1 * | 6/2013 | Liu et al. | 327/108 |
| 2013/0257491 A1 * | 10/2013 | Won et al. | 327/109 |

OTHER PUBLICATIONS

Liang Zhang, et al.; "Voltage-Mode Driver Preemphasis Technique For On-Chip Global Buses", IEEE Transactions on Very Large Scale Integration (VLSI) Systems, vol. 15, No. 2, Feb. 2007, p. 231-236.
Koon-Lun Jackie Wong, et al.; "A 27-mW 3.6-Gb/s I/O Transceiver", IEEE Journal of Solid-State Circuits, vol. 39, No. 4, Apr. 2004, p. 602-612.

* cited by examiner

*Primary Examiner* — Adam Houston
(74) *Attorney, Agent, or Firm* — Eschweiler & Associates, LLC

(57) ABSTRACT

A voltage mode driver circuit includes a plurality of VMD cells and a calibration component. The plurality of VMD cells are configured to generate a calibrated emphasis level according to a calibration signal. The calibration component is configured to determine a voltage dependence effect. Additionally, the calibration component is configured to generate the calibration signal according to the determined voltage dependence effect.

20 Claims, 10 Drawing Sheets

| MAIN | POST | DESCRIPTION |
|---|---|---|
| 0 | 0 | LONG RUN (LOW FREQ) |
| 0 | 1 | TOGGLING (HIGH FREQ) |
| 1 | 0 | TOGGLING (HIGH FREQ) |
| 1 | 1 | LONG RUN (LOW FREQ) |

250

SYSTEMS AND METHODS FOR DE-EMPHASIS LEVEL CALIBRATION IN VOLTAGE MODE DRIVERS

BACKGROUND

Voltage mode drivers are a type of driver often used in communication systems. Voltage mode drivers can be utilized to perform types of signalling schemes, such as voltage mode signalling schemes. Additionally, voltage mode drivers can be utilized to implement emphasis techniques, also referred to as pre-emphasis and de-emphasis. De-emphasis is a technique that facilitates communication reliability for distorted signals that pass a channel.

DETAILED DESCRIPTION

Figure 1:
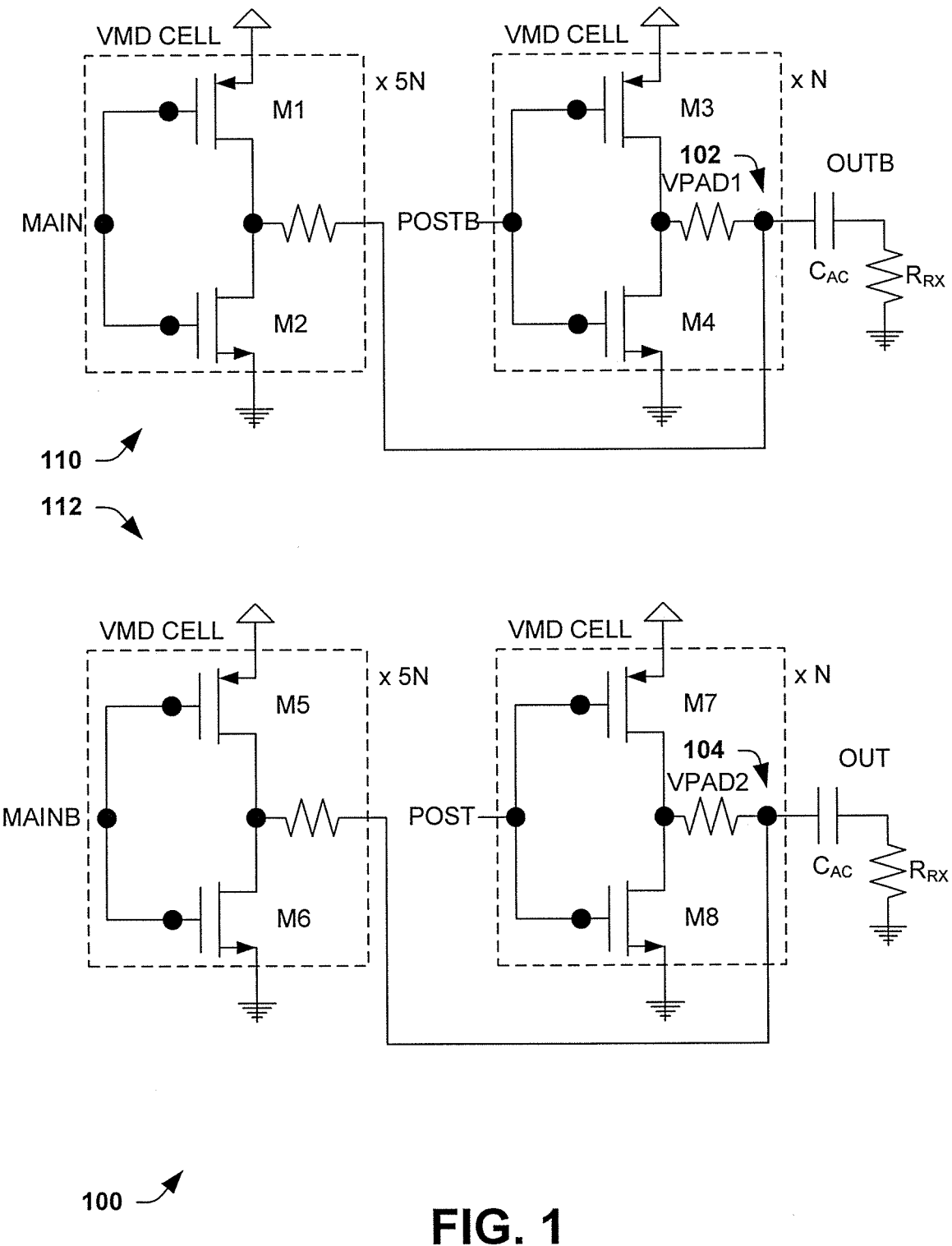
FIG. 1 is a diagram showing an example voltage mode driver 100.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

Voltage mode drivers (VMD) are often used to set emphasis levels, including de-emphasis levels, for communication systems. The voltage mode drivers can suffer from process variations and the like to provide levels that are unacceptable or outside of acceptable ranges for de-emphasis levels. Systems and methods are disclosed that calibrate or adjust voltage mode drivers to proved proper de-emphasis levels. The systems and methods to calibrate voltage mode dividers so that proper de-emphasis levels are provided despite variations, such as process variations, in the voltage mode dividers. Thus, de-emphasis level specifications can be met and VMD termination design complexity can be eased.

FIG. 1 is a diagram showing an example voltage mode driver 100. The driver 100 includes VMD cells as shown. The VMD cells generally include an upper or pull up transistor, which is a PMOS transistor, and a lower or pull down transistor, which is an NMOS transistor. A first section 110 includes a plurality of 5N MAIN cells and N POSTB cell(s) generate an output OUTB. A second section 110 includes a plurality of 5N MAINB cells and N POST cells generate an output OUT. The driver includes connection points or terminals VPAD 102 and VPAD1 104. The MAIN and MAINB cells are also referred to as main tap cells and the POST and POSTB cells are also referred to as post cursor tap cells.

The MAIN cells are comprised of series connected transistors M1 and M2. M1 is a PMOS transistor and M2 is an NMOS transistor as shown. The POSTB cell is comprised of series connected transistors M3 and M4. The MAINB cells are comprised of series connected transistors M5 and M6. The POST cell is comprised of series connected transistors M7 and M8.

In this example, with N=1 and every VMD cell having a resistance of 300 ohms, a total output impedance is 50 ohms. Receiver termination resistance $R_{RX}$ is used to sink the output signals OUT and OUTB to ground. With the total output impedance at 50 ohms, the termination resistance is set to 50 ohms. This is done when VPAD (102 and 104)=VDD*¾ for pull up resistance and VPAD=VDD*¼ for pull down resistance. However, it is noted that the termination resistance can vary with the drain to source voltage of MOS devices, which is referred to as the voltage dependence effect.

The driver 100, in this example, can obtain a 3.5 dB de-emphasis level by building 5N VMD cells in a main tap and N VMD cells in a post cursor tap. The de-emphasis level is given by:

$$\text{de-emphasis level} = 20\log\left(\frac{5N+N}{5N-N}\right) = 3.5 \text{ dB}$$

Figures 2A, 2B:
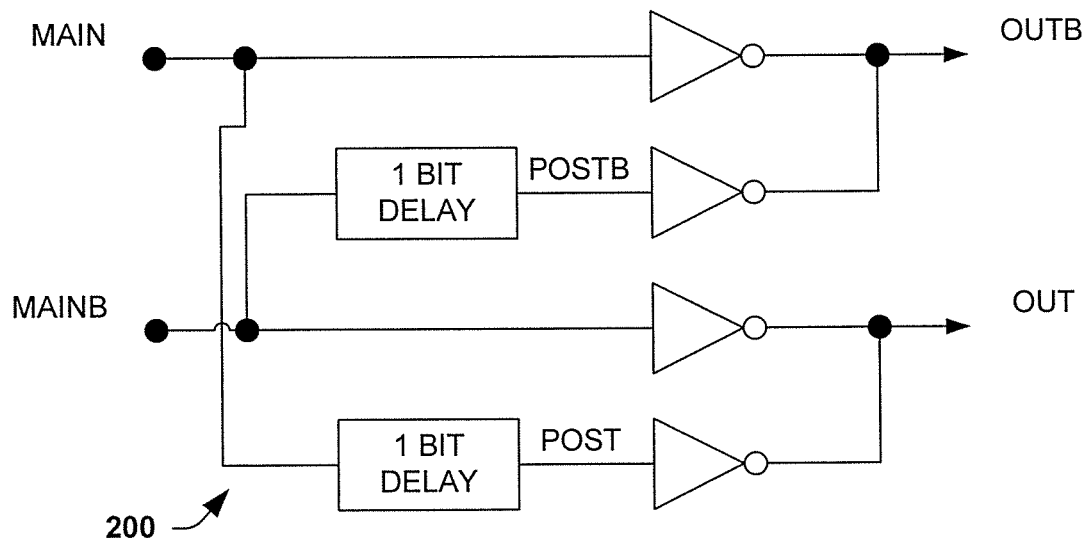
FIG. 2A is a diagram illustrating input signals and output signals for a voltage mode driver 200 and configuring an emphasis level.
FIG. 2B is a table describing various logical values for the inputs MAIN and POST.

FIG. 2A is a diagram illustrating input signals and output signals for a voltage mode driver 200 and configuring an emphasis level. The driver includes differential inputs, MAIN and MAINB. The MAIN input passes through a 1 bit delay and operates as a POST input. Similarly, the MAINB input passes through a 1 bit delay and operates as a POSTB input. The MAIN input is coupled to a first inverter, which is then coupled to an output, OUTB. The POSTB input is coupled to a second inverter, which is also coupled to the OUTB. The MAINB input is coupled to a third inverter, which is then coupled to an output, OUT. The POST input is coupled to a fourth inverter, which is then coupled to the OUT output.

FIG. 2B is a table 250 describing various logical values for the inputs MAIN and POST. It can be seen that values of 0,0 and 1,1 for MAIN and POST yield long runs and low frequencies. For values of 0,1 and 1,0 for MAIN and POST, high frequency toggling is obtained.

Figure 3A:
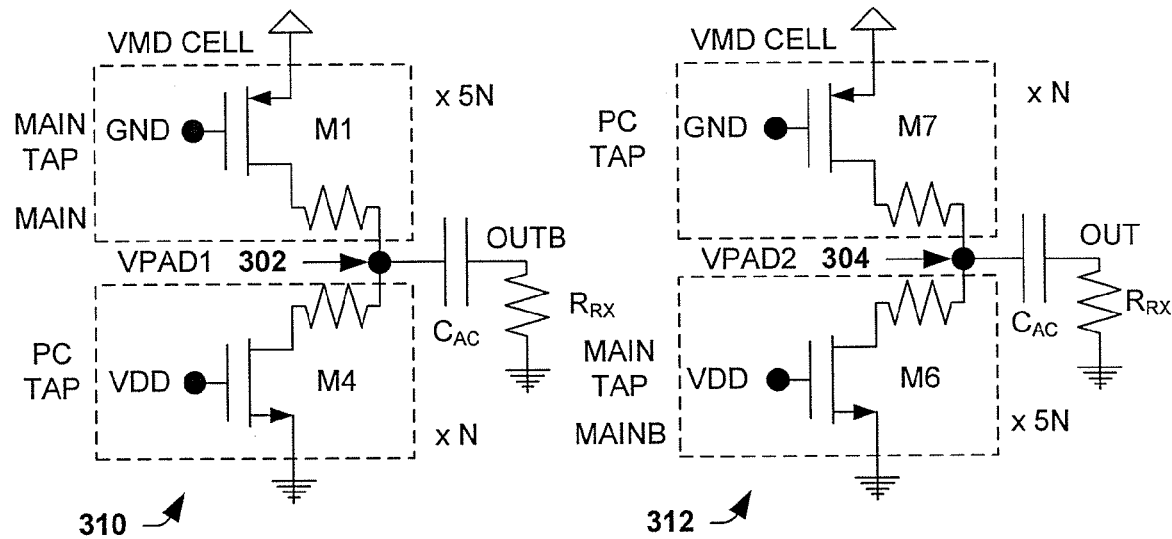
FIG. 3A is a diagram illustrating the voltage mode driver having inputs set to the above values.
Figure 3B:
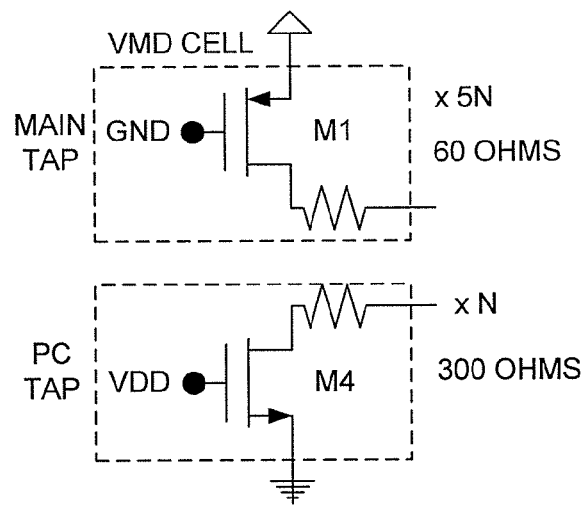
FIG. 3B is a diagram illustrating the first section of the driver with ideal values.
Figure 3C:
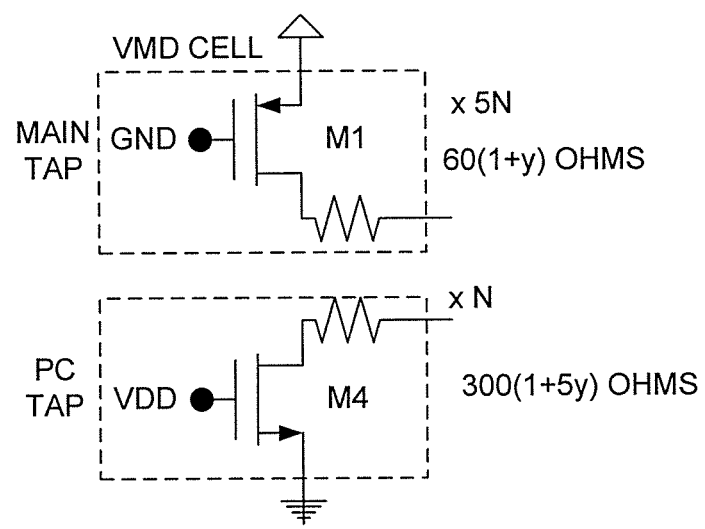
FIG. 3C is another diagram illustrating the first section of the driver with a voltage dependence effect.

FIGS. 3A, 3B, and 3C show an example voltage mode driver 300 similar to the driver 100 described above. The driver 300, in this example, has inputs MAIN and POST set to ground (GND) and inputs MAINB and POSTB set to VDD.

FIG. 3A is a diagram illustrating the voltage mode driver 300 having inputs set to the above values. VPAD1 is shown at 302 and VPAD2 is shown at 304. The driver is shown as an equivalent circuit of the driver 100 with the inputs set to the above values.

The driver 300 includes a first section 310 and a second section 312, similar to that shown in FIG. 1. However, with the inputs MAIN and POST set to ground (GND) and inputs MAINB and POSTB set to VDD, transistors M2 and M3 of the first section 310 and transistors M4 and M5 of the second section 312 are OFF and not present in the equivalent circuit. A gate of transistor M1 of the MAIN cells is set to ground and a gate of transistor M4 of the POSTB cell is set to VDD. Similarly, a gate of transistor M7 of the POST cell is at ground and a gate of transistor M6 of the MAINB cells is at VDD. Thus, the OUTB output is based on transistors M1 and M4 and the OUT output is based on transistors M7 and M6.

FIG. 3B is a diagram illustrating the first section 310 of the driver 300 with ideal values. The diagram is shown somewhat simplified in order to facilitate understanding. The MAIN cells are shown having an impedance of 60 ohms each, based on the above input values. The POSTB cell has an impedance of 300 ohms.

With MAIN=POST=GND and MAINB=POSTB=VDD, the voltage at VPAD1 is:

$$V_{PAD1} = \frac{VDD}{2} + \left(\frac{300}{300+60}VDD - \frac{VDD}{2}\right) \times \frac{1}{2} = \frac{2}{3}VDD$$

FIG. 3C is another diagram illustrating the first section 310 of the driver 300 with a voltage dependence effect. As described above, there is typically a voltage dependence effect, which is a result of changing or varied resistance based on a drain to source voltage of the transistors present in the driver 300.

Considering the voltage dependence effect and assuming it is linear and greater then zero. A voltage dependence factor is denoted as "y" and is assumed to be the same for both NMOS and PMOS devices. An effective voltage dependence effect or voltage dependence effect is the difference between actual voltage values and "the voltage values for calibration" at the pads (VPAD1 and VPAD2). Voltage dependence effect appears when the voltage on VPAD is different from the referenced voltage or the voltage for calibration. Here we let "1+y" be an effective voltage dependence effect of PMOS. Thus, the MAIN cells are shown having an impedance of 60 (1+y) ohms each, based on the above input values. "The voltage difference for NMOS is 5 times larger than that of PMOS, thus the effective voltage dependence effect for NMOS is represented at "1+5y". As a result, the POSTB cell has an impedance of 300 (1+5y) ohms. The non ideal voltage at VPAD1' is shown as:

$$V'_{PAD1} = \frac{VDD}{2} + \left(\frac{300(1+5y)}{300(1+5y)+60(1+y)}VDD - \frac{VDD}{2}\right) \times \frac{1}{2}$$

Thus, the VPAD1'>VPAD1 (the non-ideal or real pad voltage is greater than the ideal pad voltage)

The pad voltage for the second section 312 is similar.

$$V_{PAD2} = \frac{VDD}{2} - \left(\frac{VDD}{2} - \frac{60}{60+300}VDD\right) \times \frac{1}{2} = \frac{1}{3}VDD$$

-continued $$V'_{PAD2} = \frac{VDD}{2} - \left(\frac{VDD}{2} - \frac{60(1+y)}{60(1+y)+300(1+5y)}VDD\right) \times \frac{1}{2}$$

Again, the non ideal pad voltage is smaller than the ideal pad voltage (VPAD2'<VPAD2). As a result, the voltage dependence effect makes the actual voltage swing (VPAD1'−VPAD2') become larger than ideal values and, as a result, leads to a larger swing in outputs (OUT-OUTB). This swing, if uncompensated, could lead to emphasis levels, for example, less than specified or required amounts. For example, the de-emphasis level could be less than a specified limit or amount of 3.5 dB.

As an example, assume an effective resistance for a MOS device is x ohm when VDS is 1V. If VDS changes to 2V and VGS is unchanged, the effective resistance becomes x*[1+(2−1)]y. In another example, the PMOS resistance is 60 ohm when VPAD is ¾*VDD. Thus, the voltage difference is (¾−⅔)*VDD, which equals 1/12*VDD. The NMOS resistance is 300 ohm when VPAD is ¼*VDD. The voltage difference is (⅔−¼)*VDD, which equals 5/12*VDD. Thus, the effective voltage dependence effect in NMOS is 5 times larger than that in PMOS.

Figure 4:
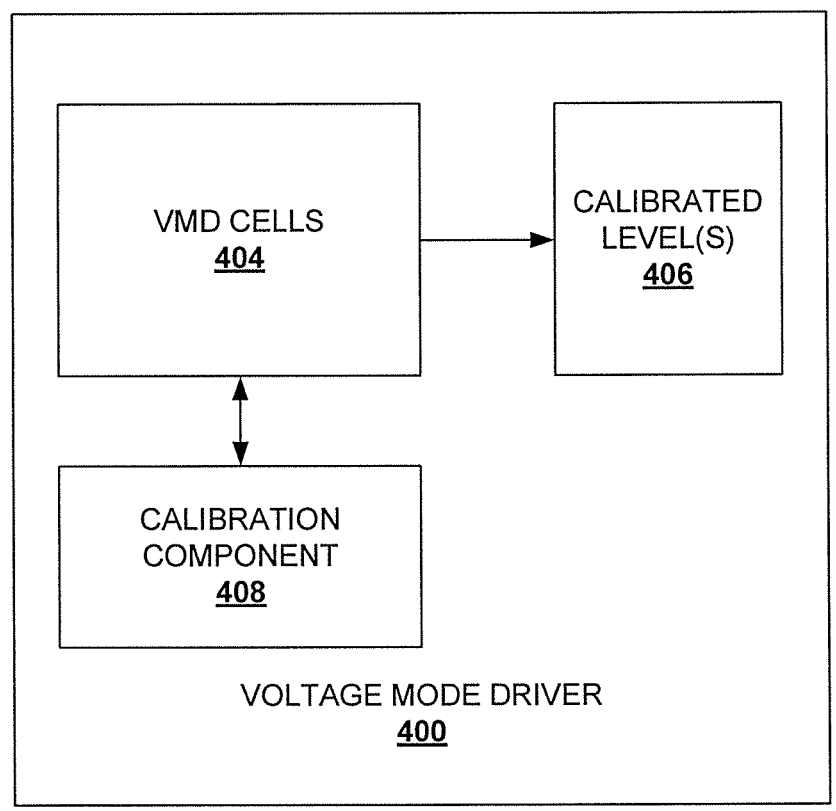
FIG. 4 is a block diagram illustrating a voltage mode driver that generates calibrated level(s) as outputs.

FIG. 4 is a block diagram illustrating a voltage mode driver 400 that generates calibrated level(s) as outputs. The driver 400 compensates for voltage dependence to provide the level (s) that are calibrated.

The driver includes VMD cells 404, a calibration component 408, and calibrated output levels 406. The VMD cells 404 include one or more cells, such as described above, that are connected to generate outputs based one or more inputs. For example, the inputs can include MAINB, MAIN, POST, POSTB, and the like. The outputs can include, for example, OUT, OUTB and the like. The VMD cells 404 receive a calibration signal in order to calibrate the outputs and provide them as calibrated output levels 406.

The calibrated output levels 406 comply with selected specifications, such as emphasis level limits, emphasis values, signal levels, and the like. In one example, the selected specifications include USB 3.0 de-emphasis level specifications.

The calibration component 408 provides the calibration signal to the VMD cells in order to compensate for voltage dependence effects.

A non-ideal or actual pad voltage for a first section of a voltage mode driver is given by:

$$V'_{PAD1} = \frac{VDD}{2} + \left(\frac{300(1+5y)}{300(1+5y)+60(1+y)}VDD - \frac{VDD}{2}\right) \times \frac{1}{2}$$

$$\frac{\partial V_{PAD1}}{\partial y} = \frac{10}{(26y+6)^2}VDD \xrightarrow{y \ll 1} \frac{5}{18}VDD$$

$$V'_{PAD1} - V_{PAD1} = \Delta V_{PAD1} = \frac{5y}{18}VDD$$

Thus, the change in VPAD1 is given by 5y/18*VDD.

Similarly, an actual pad voltage for a second section of the voltage mode driver produces a VPAD2' value lower than the ideal VPAD2 by (5y/18)*VDD.

The calibration component 408 measures the dependence effect y and determines a voltage change from the ideal pad voltages. Then, the calibration component 408 generates the calibration signal according to the pad voltage deviation and the measured voltage dependence effect.

Figure 5A:
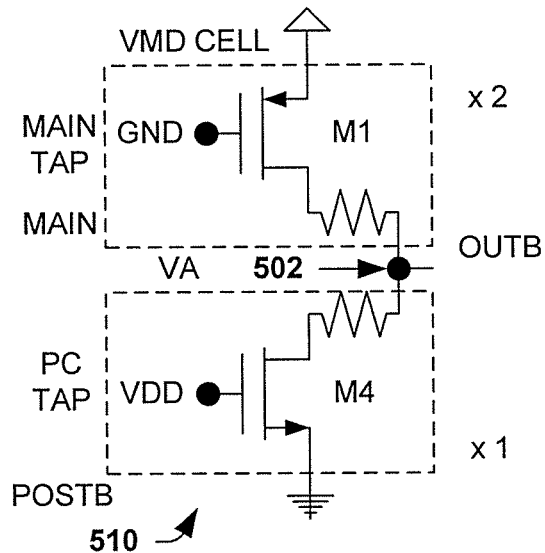
FIG. 5A is a diagram illustrating a section of a voltage mode driver.

FIG. 5A is a diagram illustrating a section of a voltage mode driver. The driver is shown with a first section 510, similar to that shown in FIG. 1. The inputs MAIN and POST set to ground (GND) and inputs MAINB and POSTB are set to VDD. Thus, transistors M2 and M3 of the first section 510 are OFF and not present in the equivalent circuit. A gate of transistor M1 of the MAIN cells is set to ground and a gate of transistor M4 of the POSTB cell is set to VDD.

There are 2 MAIN cells for pull-high and 1 POSTB cell for pull down in this example. The section has the same ideal operating point $V_A$ as VPAD1 of FIG. 3A. Thus:

$$V_{A=VPAD1} = \tfrac{2}{3}VDD$$

Further, the voltage dependence effect yields:

$$\frac{\partial V_A}{\partial y} = \frac{4}{(11y+3)^2}VDD \xrightarrow{y \ll 1} \frac{4}{9}VDD \Rightarrow \frac{\partial V_{PAD1}}{\partial y} = \frac{5}{8}\frac{\partial V_A}{\partial y} \Rightarrow \Delta V_{PAD1} = \frac{5}{8}\Delta V_A$$

Thus the change in pad voltage resulting from the voltage dependence effect is given above.

Figure 5B:
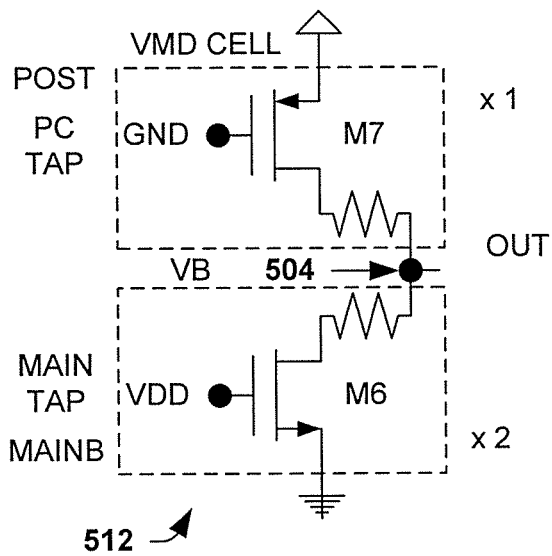
FIG. 5B is another diagram illustrating a section of a voltage mode driver.

FIG. 5B is another diagram illustrating a section of a voltage mode driver. The driver is shown with a second section 512, similar to that shown in FIG. 1. The inputs MAIN and POST set to ground (GND) and inputs MAINB and POSTB are set to VDD. Thus, transistors M4 and M5 of the second section 512 are OFF and not present in the equivalent circuit. A gate of transistor M7 of the POST cell is at ground and a gate of transistor M6 of the MAINB cells is at VDD. Thus, the OUT output is based on transistors M7 and M6.

There are 2 MAIN cells for pull down and 1 POSTB cell for pull up in this example. The section has the same ideal operating point $V_B$ as VPAD2 of FIG. 3A. Thus:

$$\Delta V_{PAD2} = \tfrac{5}{8}\Delta V_B$$

Thus, deviation from VPAD1 and VPAD2 can be measured by deviation $V_A$ and $V_B$.

Figure 6A:
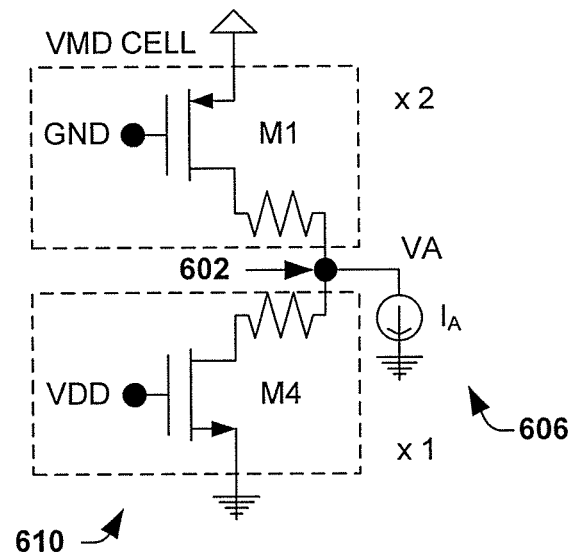
FIG. 6A is a diagram illustrating measuring a voltage dependence effect by adding a current source.
Figure 6B:
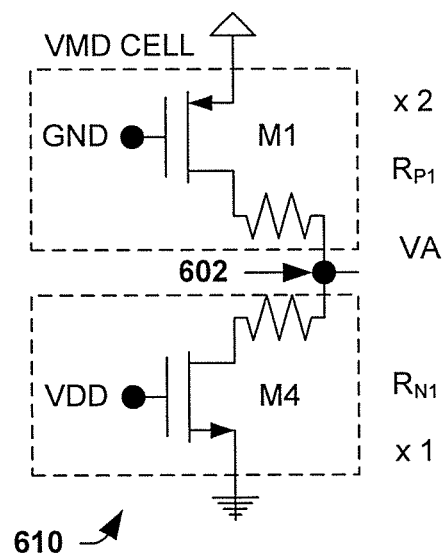
FIG. 6B is a diagram illustrating resulting impedance values for VMD cells with the addition of a current source.

FIGS. 6A and 6B are diagram illustrating addition of a current source to a node. FIG. 6A is a diagram illustrating measuring a voltage dependence effect by adding a current source. FIG. 6B is a diagram illustrating resulting impedance values for VMD cells with the addition of the current source.

If a current source $I_A$ 606 is added to node $V_A$ of FIG. 6A (also shown in FIG. 5A), the VPAD1 deviation from ideal can be determined as follows:

$$V_A = \frac{\frac{VDD}{R_{P1}} - I_A}{\left(\frac{1}{R_{P1}} + \frac{1}{R_{N1}}\right)} \Rightarrow \frac{\partial V_A}{\partial I_A} = -\left(\frac{1}{R_{P1}} + \frac{1}{R_{N1}}\right)^{-1} \Rightarrow \Delta V_A =$$

$$-\left(\frac{1}{R_{P1}} + \frac{1}{R_{N1}}\right)^{-1} I_A \approx -100 N I_A \Rightarrow \Delta V_{PAD1} \approx -\frac{500N}{8} I_A$$

Thus, the VPAD1 deviation can be measured using a current source $I_A$. Similarly, a current source $I_B$ is added to node $V_B$ of FIG. 5B, the VPAD2 deviation from ideal can be determined by the current source $I_B$ as follows:

$$\Delta V_{PAD2} \approx \frac{500N}{8} I_B$$

As a result, $I_A$ and $I_B$ can be controlled to compensate for the pad deviation values and voltage swing and emphasis levels can be controlled. Thus, for example, the calibration component 408 of FIG. 4 can control $I_A$ and $I_B$ and provide the currents as the compensation or calibration signal.

Figure 7A:
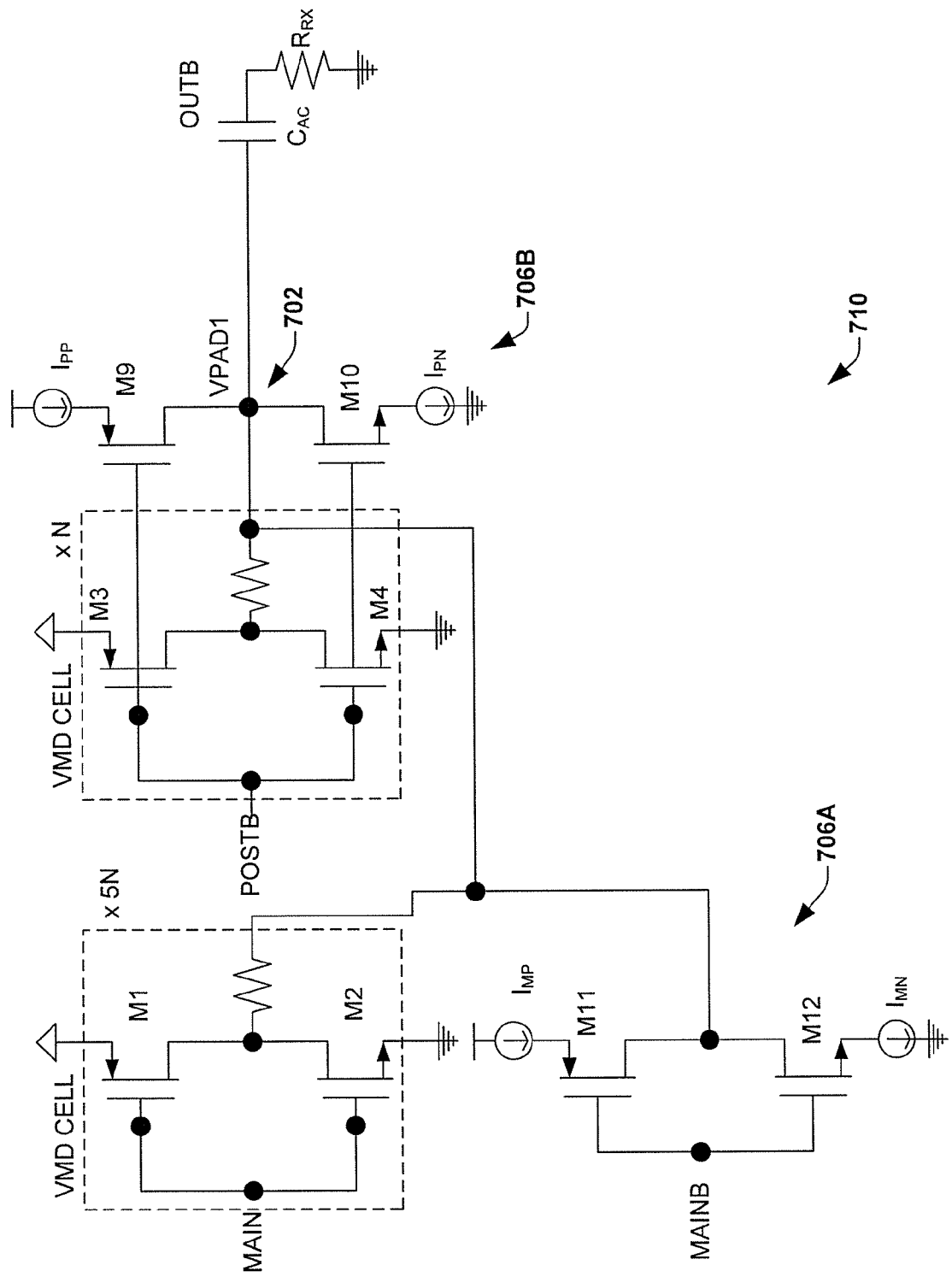
FIG. 7A illustrates a first section of a voltage mode driver and FIG. 7B illustrates a second section of the driver.
Figure 7B:
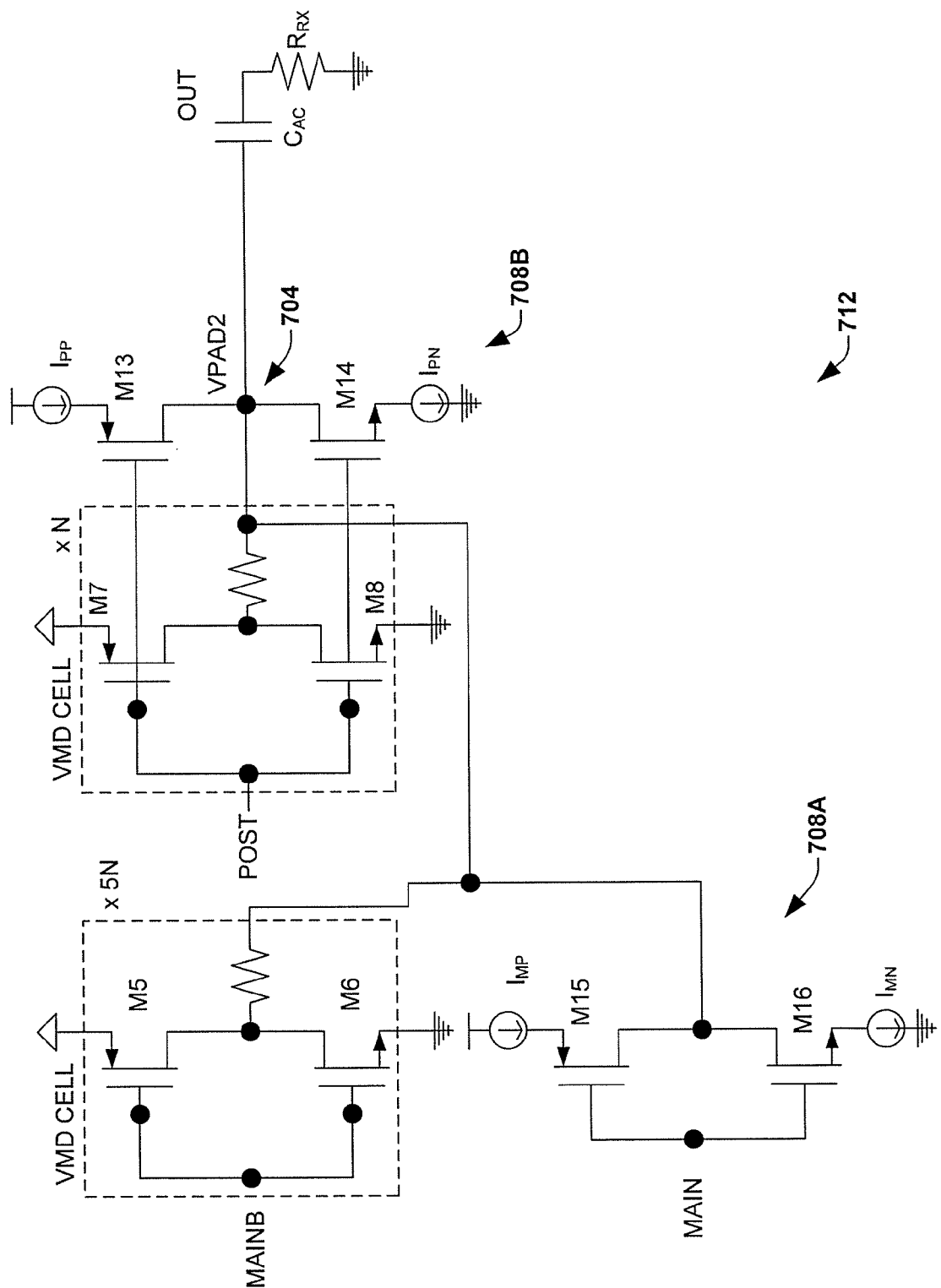

FIGS. 7A and 7B are diagrams illustrating a voltage mode driver with emphasis level calibration. FIG. 7A illustrates a first section 710 of the driver and FIG. 7B illustrates a second section 712 of the driver.

The first section 710 includes a plurality of 5N MAIN cells and N POSTB cell(s) generate an output OUTB. The second section 710 includes a plurality of 5N MAINB cells and N POST cells generate an output OUT. The driver includes connection points or terminals VPAD1 702 and VPAD2 704. The MAIN and MAINB cells are also referred to as main tap cells and the POST and POSTB cells are also referred to as post cursor tap cells.

The MAIN cells are comprised of series connected transistors M1 and M2. M1 is a PMOS transistor and M2 is an NMOS transistor as shown. The POSTB cell is comprised of series connected transistors M3 and M4. The MAINB cells are comprised of series connected transistors M5 and M6. The POST cell is comprised of series connected transistors M7 and M8.

The first section 710 also includes a first calibration component 706A and 706B. Portion 706A includes current sources $I_{MP}$ and $I_{MN}$ and series connected transistors M11 and M12. Portion 706B includes current sources $I_{PP}$ and $I_{PN}$ and series connected transistors M9 and M10. The second section 712 also includes a second calibration component 708A and 708B. Portion 708A includes current sources $I_{MP}$ and $I_{MN}$ and series connected transistors M15 and M16. Portion 706B includes current sources $I_{PP}$ and $I_{PN}$ and series connected transistors M13 and M14.

The calibration components 706 and 708 are configured to suppress or boost values at VPAD1 702 and VPAD2 704 in order to calibrate for emphasis levels. Thus, when MAIN=POST=GND and MAINB=POSTB=VDD, current sources $I_{MN}$ and $I_{PN}$ suppress VPAD1 by a deviation voltage and $I_{MP}$ and $I_{PP}$ boosts VPAD2 by a second deviation voltage.

$$(I_{MN} + I_{PN}) \times R_{RX} = \Delta V_{PAD1} = \frac{500N}{8} I_A \quad (1)$$

$$(I_{MP} + I_{PP}) \times R_{RX} = -\Delta V_{PAD2} = \frac{500N}{8} I_B \quad (2)$$

When MAIN=POSTB=GND and MAINB=POST=VDD, (VPAD1−VPAD2) swing should be unchanged.

$$I_{MP=IPN} \quad (3)$$

$$I_{MN=IPP} \quad (4)$$

According to the above equations for IMP and IMN, a best fitted solution is found as:

$$I_{MP} = I_{MN} = I_{PP} = I_{PN} = \frac{500N}{32 R_{RX}}(I_A + I_B) = \frac{5N}{16}(I_A + I_B)$$

Figure 8:
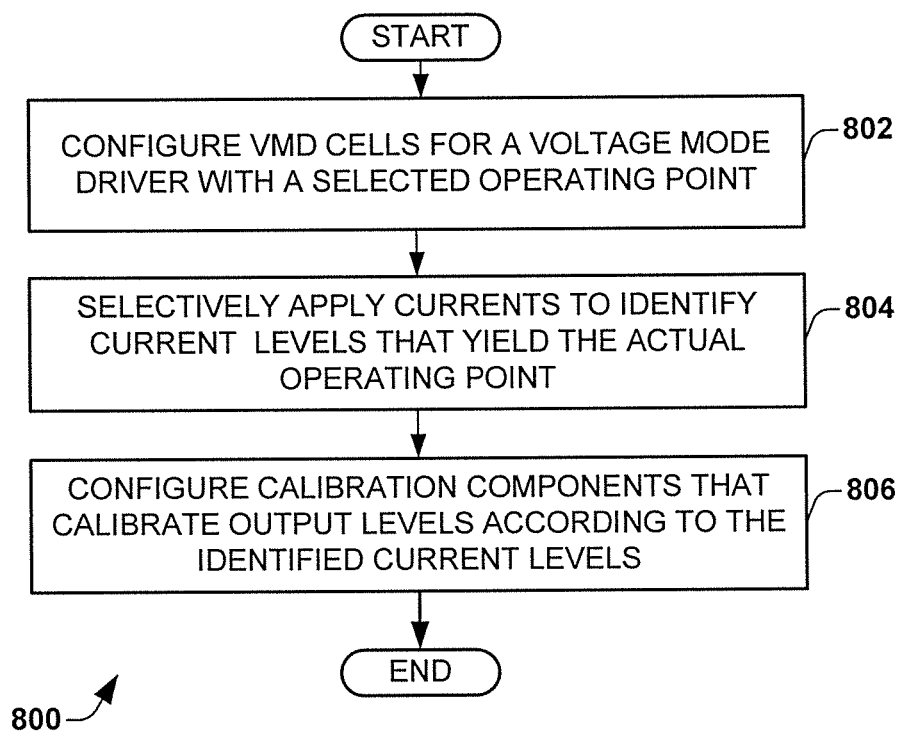
FIG. 8 is a flow diagram illustrating a method of operating a voltage mode driver that calibrates for voltage dependence effects and provides calibrated output levels.

FIG. 8 is a flow diagram illustrating a method 800 of operating a voltage mode driver that calibrates for voltage dependence effects and provides calibrated output levels. The calibrated output levels include de-emphasis levels and the like.

The method 800 begins at block 802 wherein VMD cells are configured for a voltage mode driver. The cells are configured to obtain or provide a selected operating point. Typically, the cells are configured for ideal conditions. The cells are configured with pull up and pull down arrangements. Outputs of each cell are connected to a pad node, wherein output signals are provided. A termination network is typically connected to the pad node.

A calibration current is identified for the VMD cells at block 804. The calibration current is identified to account for voltage mode dependence effects, which includes variations between an actual operating point and the selected or ideal operating point. The calibration current can be identified by applying a range of current values from zero to a max value according to a step value. A description is provided above to determine current values $I_A$ and $I_B$.

Outputs and output levels for the VMD cells are calibrated or adjusted at block 806 according to the identified calibration current. In one example, calibration components are configured to provide the identified calibration current. As a result, output levels from the VMD cells are provided within limits, including de-emphasis level specifications.

It will be appreciated that while reference is made throughout this document to exemplary structures in discussing aspects of methodologies described herein (e.g., the structure presented in Figs.—, while discussing the methodology set forth in FIG. 3), that those methodologies are not to be limited by the corresponding structures presented. Rather, the methodologies (and structures) are to be considered independent of one another and able to stand alone and be practiced without regard to any of the particular aspects depicted in the Figs.

Also, equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

A voltage mode driver circuit includes a plurality of VMD cells and a calibration component. The plurality of VMD cells are configured to generate a calibrated emphasis level according to a calibration signal. The calibration component is configured to determine a voltage mode dependence effect. Additionally, the calibration component is configured to generate the calibration signal according to the determined voltage dependence effect.

Another voltage mode driver circuit includes a first group of cells, a second cell, a measure component, and a calibration component. The first group of cells are configured to receive a first input and are coupled to a pad node. The second cell is coupled to the pad node and is configured to receive a second input. The measure component is coupled to the pad node and is configured to measure and/or determine a voltage dependence effect. The compensation component is coupled to the pad node and is configured to compensate for the voltage dependence effect.

A method of operating a voltage mode driver is disclosed. VMD cells are configured for a selected operating point. A calibration current is identified for the VMD cells by selectively applying varied currents to the VMD cells. The calibration current is associated with a voltage dependence effect. The calibration current is supplied to the VMD cells to obtain calibrated output levels. In one example, the calibrated output levels comply with de-emphasis level specifications.

While a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A voltage mode driver circuit comprising:
a plurality of VMD cells configured to generate a calibrated emphasis level according to a calibration signal; and
a calibration component configured to determine a voltage dependence effect and generate the calibration signal according to the voltage dependence effect, wherein the calibration signal includes a current.

2. The circuit of claim 1, wherein the plurality of VMD cells include pull up and pull down transistors.

3. The circuit of claim 1, wherein the VMD cells include a MAIN cell and a POSTB cell.

4. The circuit of claim 1, wherein the VMD cells generate first and second output signals as the calibrated emphasis level.

5. The circuit of claim 1, wherein the calibration component determines the voltage dependence effect by introducing a current to at least a portion of the VMD cells.

6. The circuit of claim 1, wherein the calibration component is configured to determine a deviation from an ideal operating point in order to determine the voltage dependence effect.

7. The circuit of claim 6, wherein the calibration component is configured to determine a compensating voltage deviation for the VMD cells.

8. The circuit of claim 1, wherein the calibration component includes one or more current sources to generate the calibration signal.

9. The circuit of claim 1, wherein the VMD cells comprise a first section configured to generate a portion of the calibrated emphasis level.

10. The circuit of claim 9, wherein the VMD cells further comprise a second section configured to generate a second portion of the calibrated emphasis level.

11. The circuit of claim 1, further comprising a termination design coupled to an output of the VMD cells, wherein the termination design is based on the calibrated emphasis level.

12. A voltage mode driver circuit comprising:
a first group of cells coupled to a pad node and configured to receive a first input;
a second cell coupled to the pad node and configured to receive a second input;
a measure component configured to measure a voltage dependence effect of at least the first group of cells; and
a compensation component coupled to the pad node and configured to compensate for the voltage dependence effect.

13. The circuit of claim 12, wherein the voltage dependence effect includes a difference between ideal and actual values on the first input set to VDD and the second input set to GND.

14. The circuit of claim 12, wherein the compensation component includes a current source configured to supply a compensation current to the pad node.

15. The circuit of claim 14, wherein the measure component includes a current source configured to supply a measure current to at least a portion of the first group of cells and to identify a current value that yields a selected node voltage for the pad node.

16. The circuit of claim 12, further comprising a second section having a second pad node, wherein the second pad node and the pad node are configured to provide calibrated de-emphasis levels.

17. A method of operating a voltage mode driver, the method comprising:
   configuring VMD cells for a selected operating point;
   identifying a calibration current for the VMD cells by selectively applying varied currents to the VMD cells; and
   supplying the calibration current to the VMD cells to obtain calibrated output levels.

18. The method of claim 17, wherein configuring the VMD cells includes setting the selected operating point to ⅔ VDD.

19. The method of claim 17, wherein selectively applying varied currents comprises applying current values from zero to a max value according to a step value.

20. The method of claim 17, wherein the calibrated output levels comply with de-emphasis level specifications.

* * * * *